(12) United States Patent
Kasuya

(10) Patent No.: US 6,502,741 B2
(45) Date of Patent: Jan. 7, 2003

(54) CYLINDRICAL BODY OF FIBER DRUM AND METHOD OF FABRICATING THE CYLINDRICAL BODY

(75) Inventor: Motoharu Kasuya, Wakayama (JP)

(73) Assignee: Taiyo Sealpack Co., Ltd., Wakayama (JP)

( * ) Notice: Subject to any disclaimer, the term of this patent is extended or adjusted under 35 U.S.C. 154(b) by 0 days.

(21) Appl. No.: 09/813,943

(22) Filed: Mar. 22, 2001

(65) Prior Publication Data
US 2001/0023890 A1 Sep. 27, 2001

(30) Foreign Application Priority Data
Mar. 22, 2000 (JP) .......................................... 2000-080334

(51) Int. Cl.$^7$ ............................... B65B 9/10; B65D 3/30
(52) U.S. Cl. ........................... 229/5.5; 229/5.6; 493/158
(58) Field of Search .......................... 229/5.5, 5.6, 4.5; 220/640–642; 493/152, 158, 159, 459

(56) References Cited

U.S. PATENT DOCUMENTS

| | | | |
|---|---|---|---|
| 1,031,615 A | | 7/1912 | Beadle |
| 1,096,880 A | | 5/1914 | Wright |
| 1,256,933 A | * | 2/1918 | Schriner ...................... 220/642 |
| 1,301,840 A | | 4/1919 | Hawkins |
| 1,462,443 A | | 7/1923 | Brooks |
| 1,685,370 A | | 9/1928 | Moore |
| 1,700,742 A | | 2/1929 | Moore |
| 1,912,884 A | | 6/1933 | Bodor |
| 2,120,900 A | | 6/1938 | Moore |
| 2,141,556 A | | 12/1938 | Reifsnyder |
| 2,406,758 A | | 9/1946 | Gazette |
| 2,623,681 A | | 12/1952 | Wilcox |
| 2,633,095 A | * | 3/1953 | Magill et al. ................. 229/5.6 |
| 2,641,827 A | | 6/1953 | Carpenter |
| 3,381,594 A | * | 5/1968 | Ellerbrock et al. ........... 229/5.6 |
| 4,190,187 A | * | 2/1980 | Nelms .......................... 229/5.5 |
| 4,368,841 A | * | 1/1983 | Eddy ............................ 229/5.5 |
| 4,375,969 A | * | 3/1983 | Woerz .......................... 493/158 |
| 4,538,758 A | * | 9/1985 | Griffith ........................ 229/5.6 |
| 4,557,414 A | * | 12/1985 | Ford et al. ..................... 229/5.5 |
| 4,890,786 A | * | 1/1990 | Oberhofer et al. ............ 229/5.5 |
| 1,796,075 A1 | | 3/2002 | Blixt |

FOREIGN PATENT DOCUMENTS

| | | |
|---|---|---|
| EP | 0458662 | 11/1991 |
| FR | 2766459 | 1/1999 |
| GB | 492 163 A | 9/1983 |
| GB | 2266490 | 11/1993 |
| GB | 2314827 | 1/1998 |

OTHER PUBLICATIONS

Patent Abstracts of Japan, JP 2000 185724 A, Jul. 4, 2000.
United States Patent Application Serial No. 09/761,189, Motoharu, KASUYA, filed Jan. 18, 2001.

* cited by examiner

Primary Examiner—Gary E. Elkins
(74) Attorney, Agent, or Firm—Wenderoth, Lind & Ponack, L.L.P.

(57) ABSTRACT

A cylindrical body of a fiber drum comprises a roll of a paper material having two opening ends, a curled portion formed by curling the edge of at least one of the two opening ends, and a protective material for covering an outer surface of the curled portion. A method of fabricating a cylindrical body of a fiber drum comprises winding a length of paper sheet in layers, between which layers an adhesive is applied, to form a roll of the paper sheet having two opening ends. Then, a protective material is provided on an opening edge at either of the two opening ends of the roll, and the opening edge at the said either of the two opening ends of the roll is inwardly or outwardly curled together with the protective material before the adhesive is cured between the layers. Thus, formed is a curled portion covered at an outer surface with the protective material.

3 Claims, 11 Drawing Sheets

CYLINDRICAL BODY OF FIBER DRUM AND METHOD OF FABRICATING THE CYLINDRICAL BODY

BACKGROUND OF THE INVENTION

1. Field of the Invention

The present invention relates to a cylindrical body of a paper material constituting a fiber drum and a method of fabricating the cylindrical body.

2. Prior Art

A conventional cylindrical body of a fiber drum is made of a roll of a paper material, and its opening edges at both upper and lower ends of the roll are inwardly curled together with metal rings for reinforcement, thus forming inwardly curled annular portions.

When the fiber drum is used for storage of powder or granules of medical product or fine chemical, it may be provided with an inner bag or container made of a synthetic resin material for being air-tightly filled with the powder or granules. Yet, if the inner bag or container is fouled with dust of the paper material of the cylindrical body, it may appear as suffering from leakage or contamination from the paper dust, and its quality management will hardly be qualified. Accordingly, it is a major issue to inhibit the generation of paper dust.

SUMMARY OF THE INVENTION

The present invention is developed in view of the above aspects and its object is to provide a cylindrical body of a fiber drum which can prevent the generation of paper dust while the opening edges of a roll thereof are being shaped, improve the physical strength of the opening edges, and facilitate its recycling and a method of fabricating the cylindrical body.

For achievement of the object, a cylindrical body of a fiber drum according to the present invention is featured in which at least one opening edge, or the other opening edge, of a roll made of a cylindrical paper material has an inwardly or outwardly curled portion and is protected at its outer surface with a protective material. This will increase the physical strength of the one or other opening edge. Also, if the curled end of the curled portion is injured or cracked, its outer surface is protected with the protective material, thus inhibiting paper dust generated at the injury or cracks from dispersing to the outside.

The protective material may preferably be a length of paper tape. This will require no particular separation of the protective material from the roll during the disposal process.

A method of fabricating the cylindrical body of a fiber drum according to the present invention is provided. The method comprising the steps of: winding a length of paper sheet into layers, between which layers an adhesive is applied to form a roll; providing a protective material on the opening edge at either one or the other opening end of the roll; and curling inwardly or outwardly the opening edge at either the one or the other opening end of the roll together with the protective material, before the adhesive between the paper layers is completely cured, to form a curled portion covered at the outer surface thereof with the protective material. As the curled portion is formed within a short period of time, a number of the cylindrical bodies can be fabricated at higher efficiency.

DETAILED DESCRIPTION OF THE PREFERRED EMBODIMENTS

Some embodiments of the present invention will be described in more detail.

Figure 1:
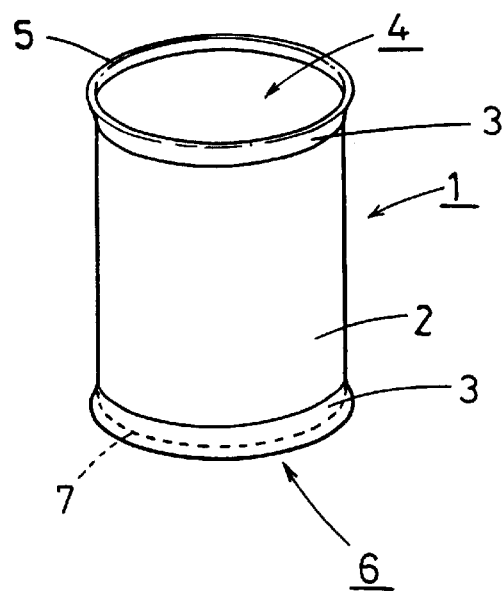
FIG. 1 is a perspective view of a cylindrical body showing a first embodiment of the present invention.
Figure 2:
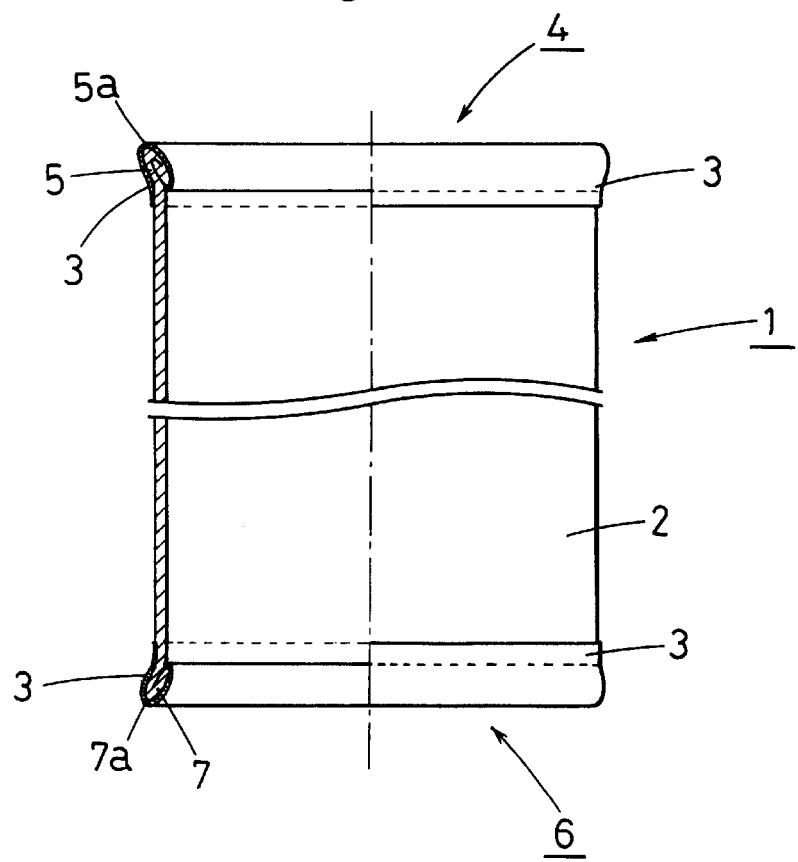
FIG. 2 is a cross sectional view of one side of the cylindrical body according to the first embodiment of the present invention.
Figure 3:
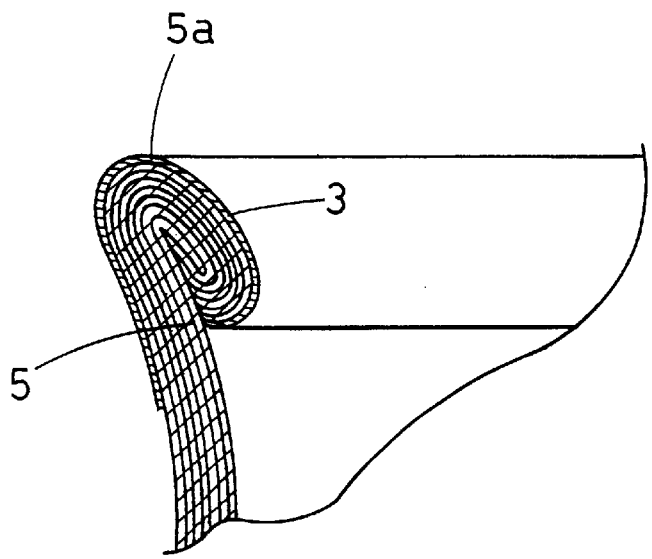
FIG. 3 is a partially enlarged cross sectional view of the cylindrical body according to the first embodiment of the present invention.

FIG. 1 is an external view of a cylindrical body of a fiber drum showing a first embodiment of the present invention, and FIG. 2 is a front view showing the cross section of one side of the cylindrical body. FIG. 3 is a partially enlarged cross sectional view of the cylindrical body.

As shown, the cylindrical body 1 of the fiber drum comprises a roll 2 made of a paper material and a protective tape 3 of a paper material provided as a protective member. The roll 2 may be fabricated by rolling a thick paper board into a cylindrical form, or rolling a plurality of paper sheets into a multi-layer form which will be explained later in more detail. The protective tape 3 may be a length of craft tape having an adhesive coating provided on the back side thereof.

As shown in FIGS. 1 to 3, one edge at one opening 4 of the roll 2 is inwardly curled to form a curled portion 5 of an annular form which extends circumferentially and has an oval shape in cross section. The protective tape 3 is bonded to the circumference of the curled portion 5. The curled portion 5 is pressed down together with the protective tape 3 so that its inner cavity is eliminated.

Similarly, the edge at the other opening end 6 of the roll 2 is curled to have a curled portion 7 which is identical in shape to that of the curled portion 5 provided at the edge of the opening end 4. The curled portion 7, like the curled portion 5, is protected with another protective tape 3 and pressed down in the same manner.

As both the roll 2 and the protective tape 3 of the cylindrical body 1 are made of paper materials, they need not be separated during a disposal process of the cylindrical body 1 but can easily be recycled for reuse.

The two curled portions 5 and 7 are protected with the corresponding protective tapes 3, and even if they are wrinkled and injured when being curled and thus produce paper dust, the protective tapes 3 can inhibit the paper dust from being scattered to the outside.

Also, the curled portions 5 and 7 are pressed down so that their inner cavities are eliminated and their physical strength will be increased.

The protective tapes 3 of this embodiment are made of, but not limited to, the craft tape having the adhesive layer provided on the back side thereof. For example, the protective tapes 3 may be made of a synthetic resin material such as poly-propylene tape or cellophane tape. Those materials of tape can equally inhibit paper dust generated at the reinforcement of the opening end, or any crack at the edge, from scattering.

A method of fabricating the cylindrical body 1 will now be described.

Figure 4:
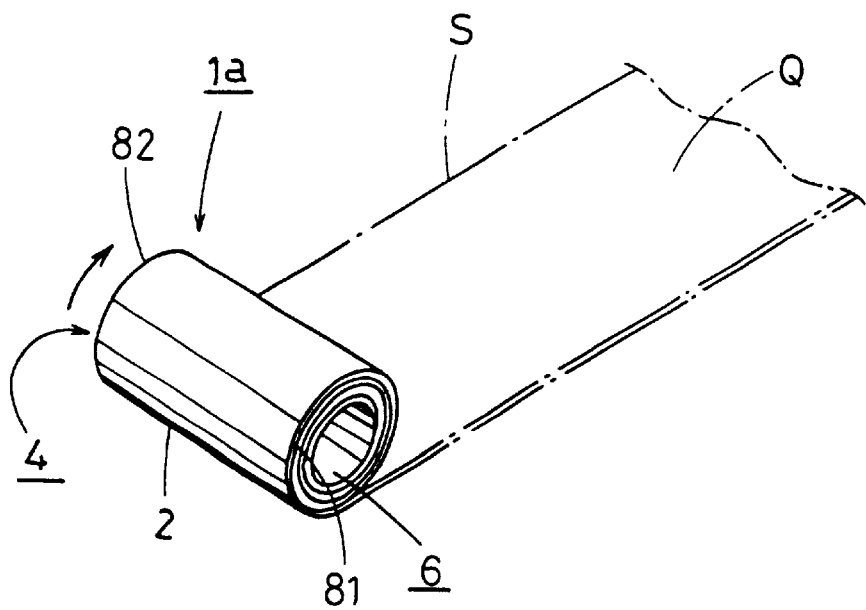
FIG. 4 is an explanatory view showing a process of forming a green roll of the cylindrical body.
Figure 5:
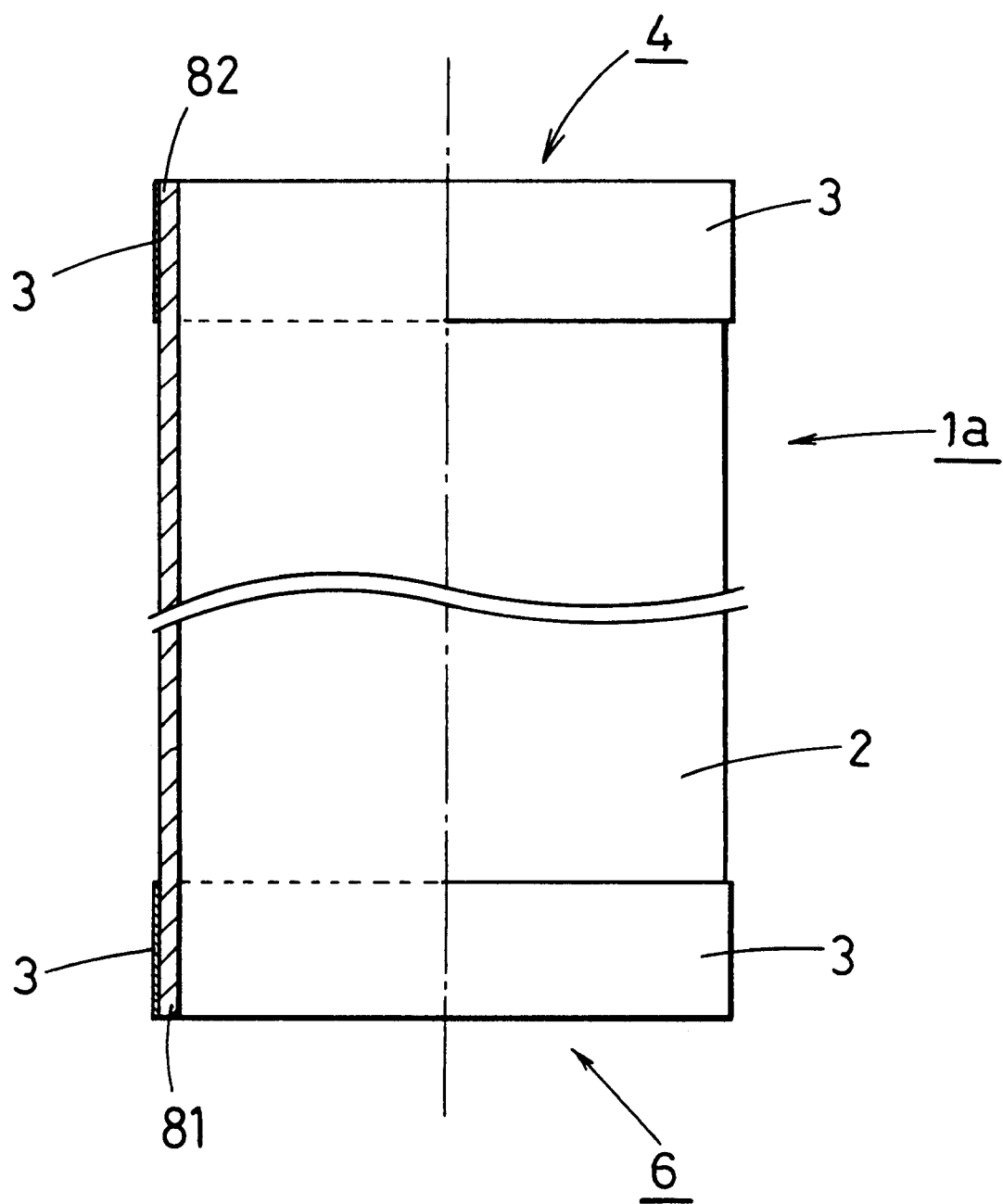
FIG. 5 is a cross sectional view of one side of the cylindrical body where its roll is protected with a protective tape material.

The method starts with a step of forming a green cylindrical body 1a as shown in FIG. 4. More specifically, a length of paper sheet S coated at its upper side with an adhesive Q before curing is wound in seven to eight layers on a mandrel of a drum forming machine (not shown) to form a roll 2 of the green cylindrical body 1a. The adhesive Q may be any commercially available hydrophilic adhesive composed mainly of e.g. poly-vinyl acetate emulsion or poly-vinyl alcohol.

Then, a protective tape (a protective member) 3 of a paper material, which has an adhesive coating provided on the back side thereof and a synthetic resin coating provided on the front side thereof, is circumferentially applied to the outer surface of each of edges 81 and 82 at both opening ends of the green cylindrical body 1a, hence completing the roll 2.

The width of the protective tapes 3 are so sized as to cover completely the curled ends 5a and 7a of their respective curled portions 5 and 7 (See FIGS. 2 and 3).

The protective tapes 3 maybe applied as slightly spaced from the opening edges 81 and 82 so long as they cover completely the curled ends 5a and 7a of the curled portions 5 and 7.

Figure 6:
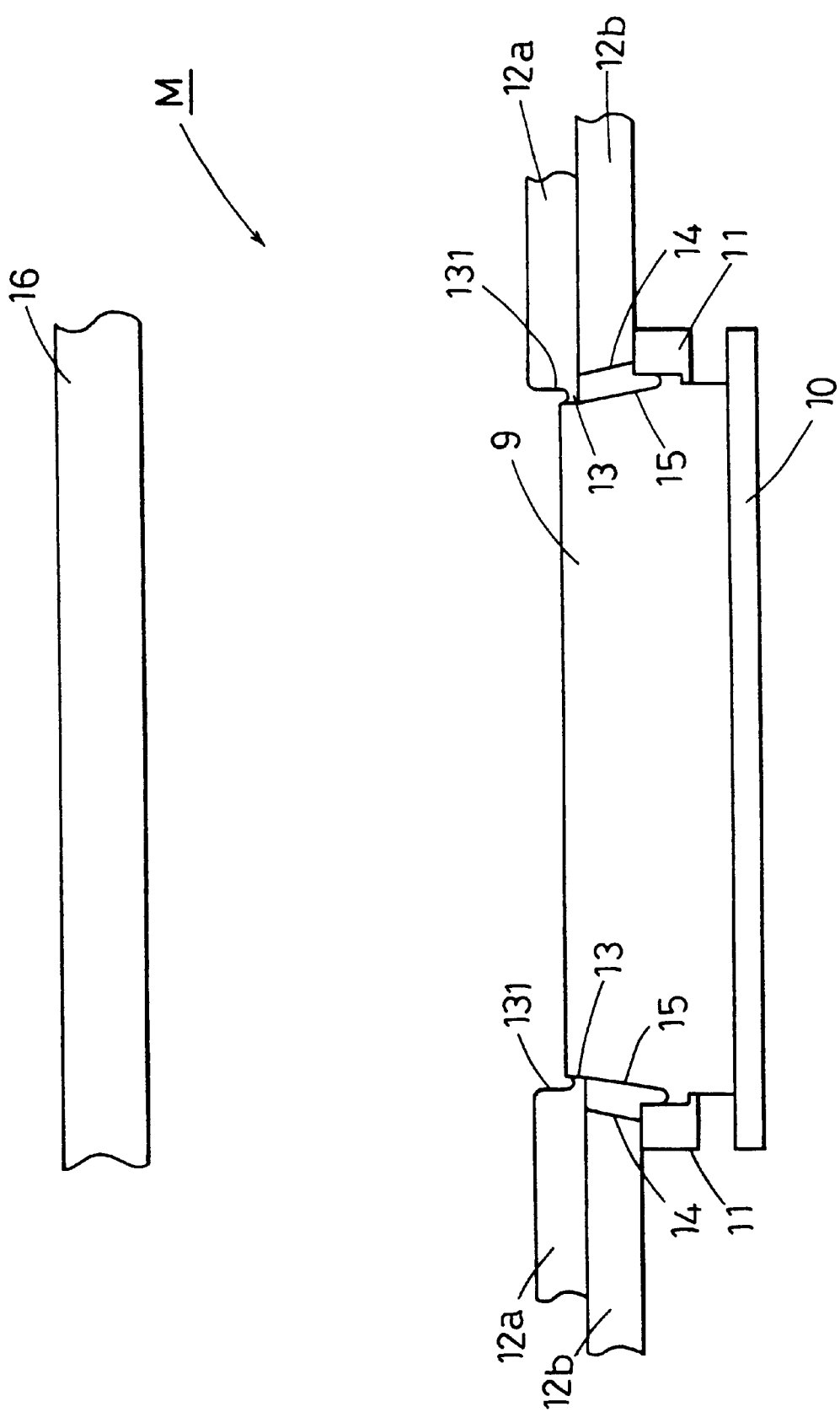
FIG. 6 is a front view of a forming machine.

The roll 2 is then transferred to perform a curled portion forming step which may be carried out by a forming machine M shown in FIG. 6. The forming machine M performs a sequence of three steps; namely a first step of inwardly curling both edges 81 and 82 of the roll 2, a second step of increasing the cross-sectional area defined by each inwardly curled portion by deforming each inwardly curled portion radially and outwardly, and a third step of pressing down the inwardly curled portions.

The forming machine M has a forming die 9, having substantially a circular shape in a plan view, placed on a platform 10 supported by a floor bed and fixedly held at an intermediate portion of its outer side with an annular chuck support 11. A first chuck 12a and a second chuck 12b which travel forward and backward along a horizontal direction are provided on an upper side of the chuck support 11.

The first chuck 12a is located above the second chuck 12b and has a guide region 13 provided on an inner wall thereof for inwardly curling the edge of the roll with a guiding surface 131.

An inner wall of the second chuck 12b, which is located beneath the first chuck 12a, is a tapered surface 14 which is tilted to increase in opening towards a lower end of the second chuck 12b and is opposite to a tapered surface 14 of an outer side of the forming die 9 tilted at the same angle. A vertically movable pressing member 16 is provided precisely above the forming die 9 for pressing down the roll 2 against the forming die 9.

Figure 7:
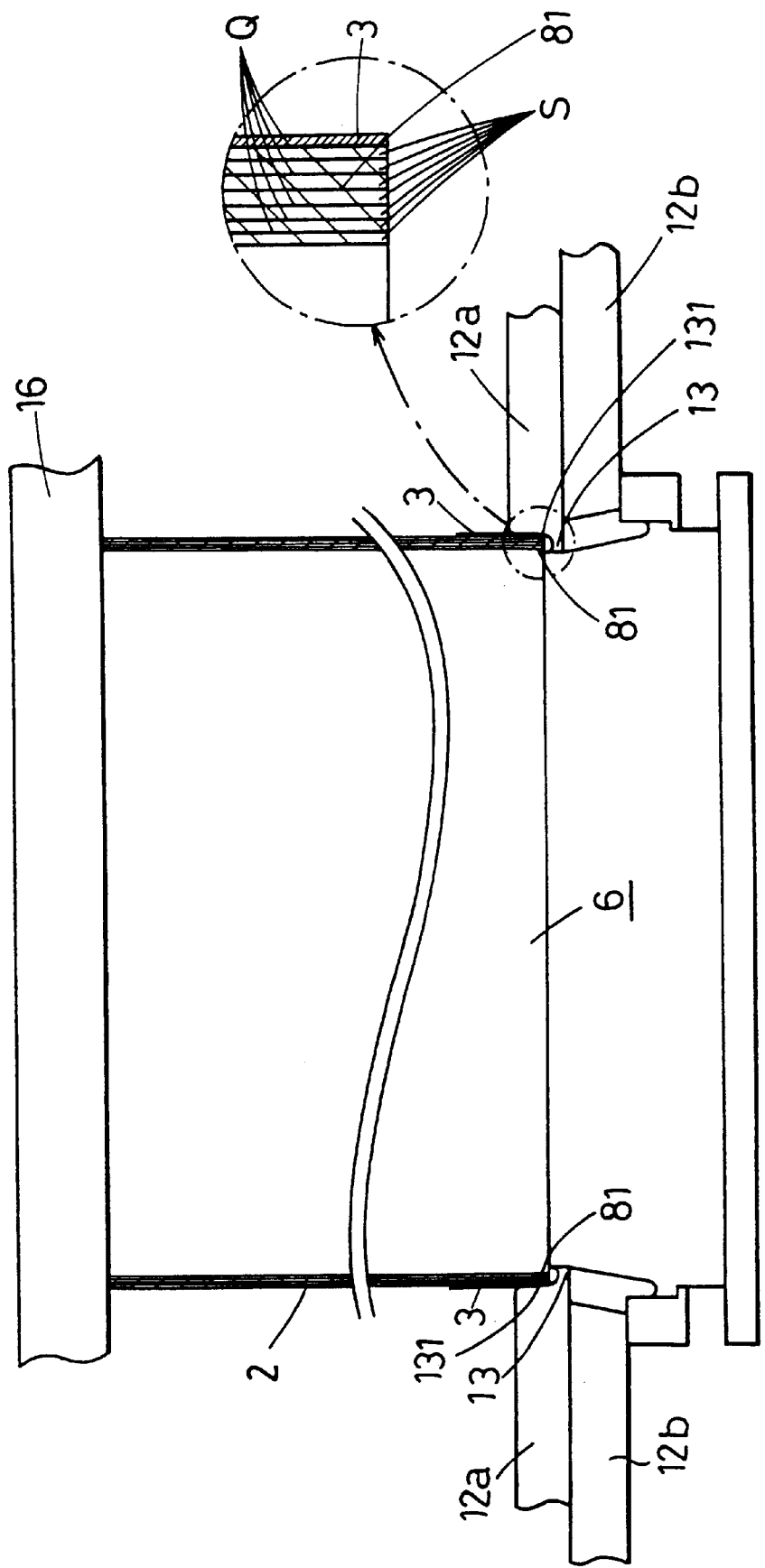
FIG. 7 is a cross sectional front view showing the roll placed in the forming machine.

In operation, the roll 2 of the layers of the paper sheet S before the adhesive Q is cured is loaded and placed upright on the guide region 13 of the first chuck 12a as shown in FIG. 7. While FIG. 7 illustrates the edge at the other opening 6 for simplicity of the description, the edge at the one opening 4 of the roll 2 can also be shaped after turning the roll 2 up side down.

Figure 8:
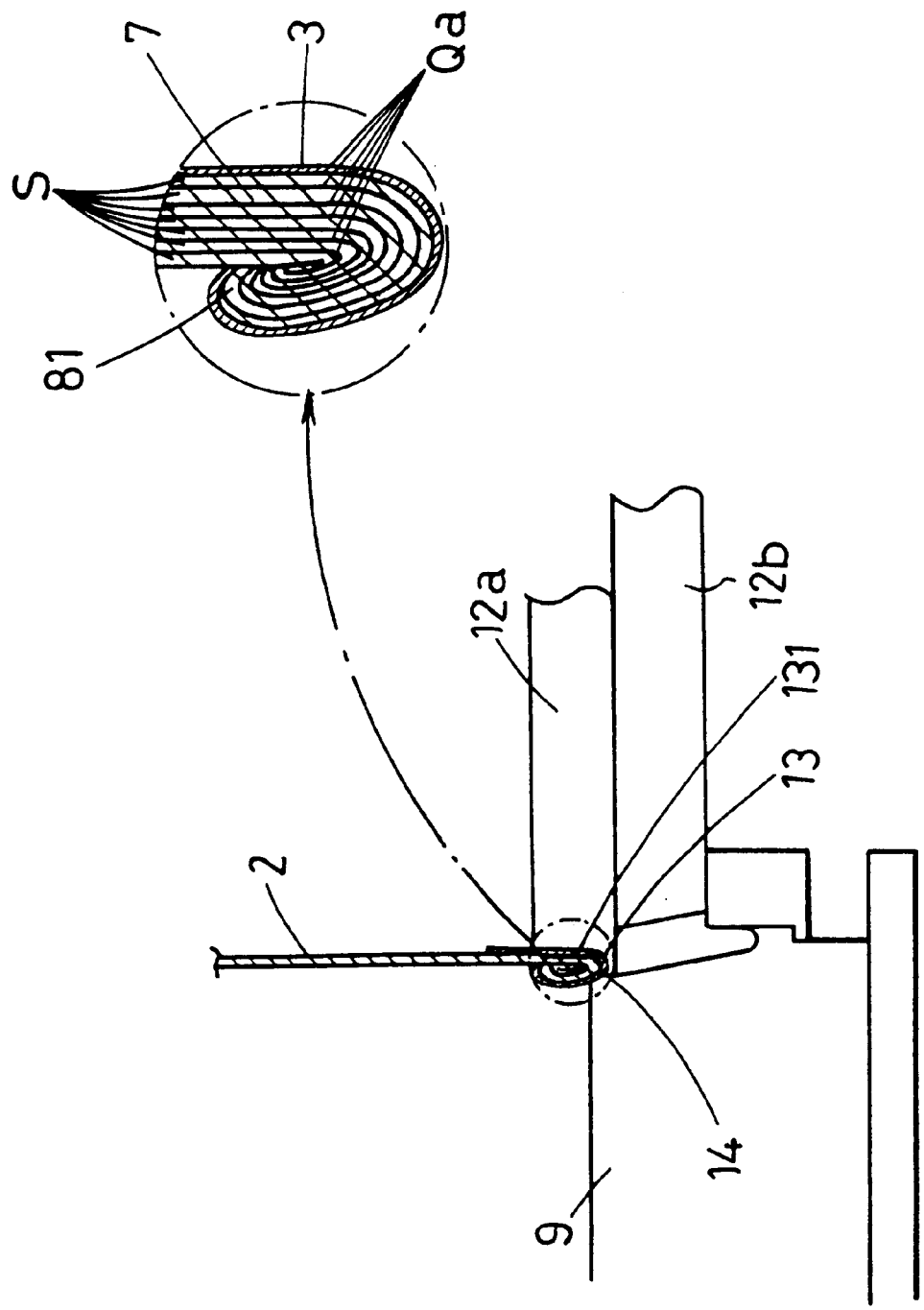
FIG. 8 is an enlarged cross sectional view of a primary part of the roll with a curled portion provided at one opening edge thereof.

When the pressing member 16 is lowered, the opening edge 81 moves along and on the guiding surface 131 as shown in FIG. 8. As the protective tape 3 slides directly along the guiding surface 131 of the guide region 13 and the tapered surface 14 of the first chuck 12a extending continuously from the guide region 13, the edge 81 is inwardly curled to form the curled portions 5 and 7.

When pressed down, the inner layers of the paper sheet S of the roll 2 lag behind the outer layers due to a difference in the curvature radius at the curled portion 5 or 7. The layers of the paper sheet S when curled are not separated but remain bonded to each other by the action of the adhesive Q. Also, the adhesive serves as a lubricant to assist the lagging. Simultaneously, as the layers of the paper sheet S are curled, portions of the adhesive Q between the layers of the edge 81 of the roll 2 are squeezed out, hence running over the inner side of the roll 2. As a result, these of the adhesive Q may contribute to higher adhesiveness and when cured, the improved rigidity of the curled portions 5 and 7.

By the above manner, the curled portions 5 and 7 of the roll 2 are formed at the one opening 4 and the other opening 6, respectively. As known, the curled portions 5 and 7 are instantly formed in sequence. Then, as the adhesive Q is cured between the layers of the paper sheet into a cured adhesive Qa, the curled portions 5 and 7 are increased in rigidity.

Figure 9:
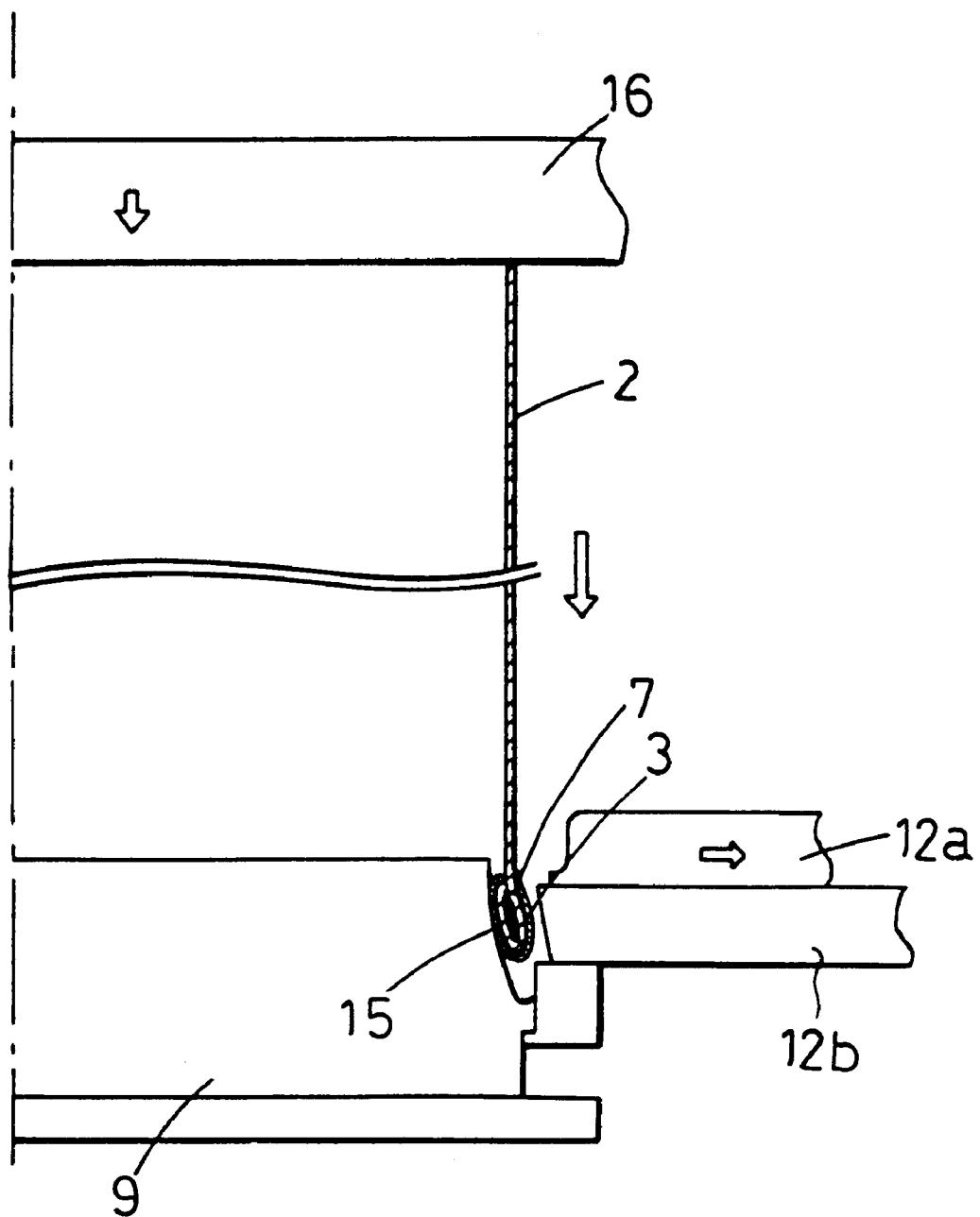
FIG. 9 is a cross sectional front view showing an action of the curled portion being outwardly expanded by a forming die.

This is followed by retracting the first chuck 12a from the curled portions 5 and 7 and lowering the pressing member 16 further as shown in FIG. 9. As moved along the tapered surface 15 of the outer side of the forming die 9, the curled portion 7 is turned outwardly. If the tilting angle is too large, the curled portion 7 may have flaws extending radially. It is thus essential to determine an appropriate angle of tilting for eliminating the generation of flaws.

Figure 10:
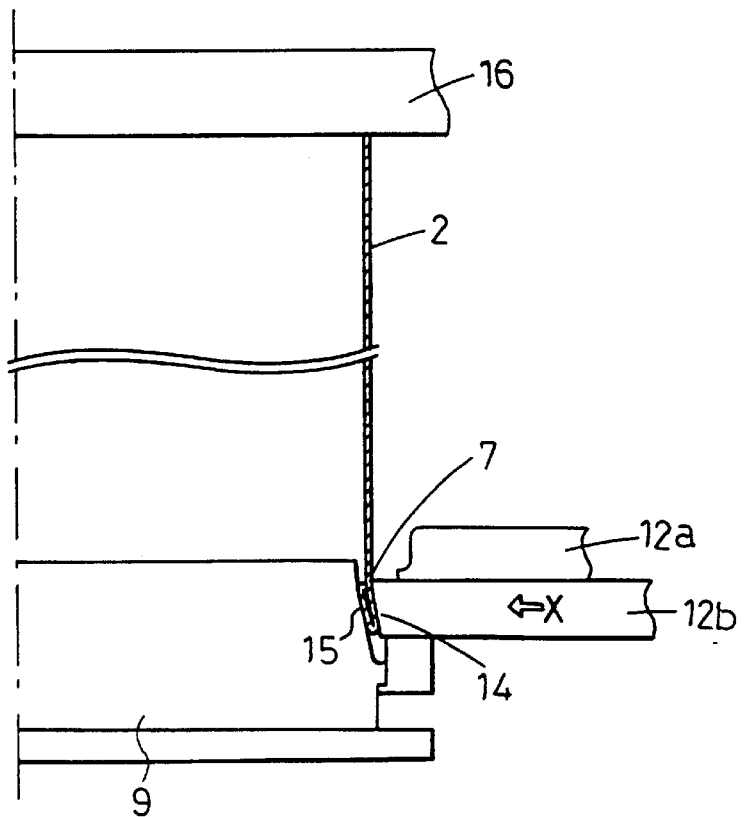
FIG. 10 is a cross sectional front view showing the curled portion fractured with a chuck.

As shown in FIG. 10, the tilted curled portion 7 is held directly in contact with the tapered surface 15 of the forming die 9, and then the second chuck 12b is advanced in the direction X denoted by the arrow in FIG. 10 to press down the curled portion 7. Any hollow space in the curled portion 7 may decrease the physical strength at the opening of the roll 2. The pressing down of the curled portion 7 may require a pressing force to prevent formation of any hollow space.

As described above, the curled portions 5 and 7 are covered with the protective tapes 3. Accordingly, the curled portions 5 and 7 are not only reinforced in rigidity but also can be prevented from having paper dust at any crack scattering out. Also, because the protective tapes 3 are applied at a fair tension, they can protect the curled portions 5 and 7 from being cracked, and when any crack is developed, the effects of the crack are minimized. Moreover, as the protective tapes 3 are slippery on their upper sides, they allow the edges 81 and 82 to slide directly on the guiding surface 131 and the tapered surface 14 of the forming die 9 until the curled portions 5 and 7 are completed. Accordingly, the curled portions 5 and 7 are less susceptible to cracking or injury.

It is a good idea that when the adhesive Q is about cured before the curled portions 5 and 7 are completely shaped, the body is heated up for softening the adhesive Q between the layers of the paper sheets. If the adhesive Q is of a hot melting type, it has to be heated to higher than its melting point.

Figure 11:
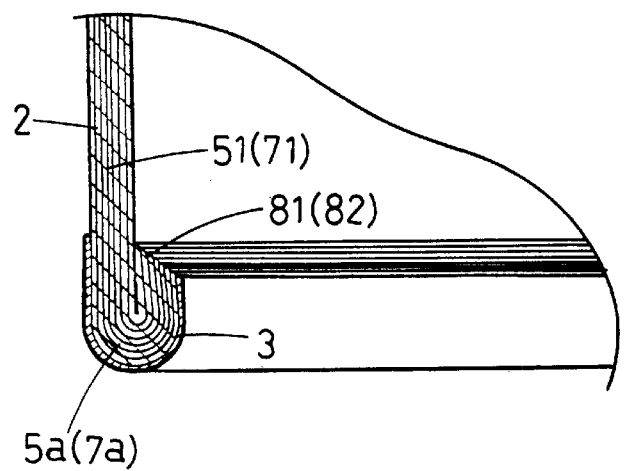
FIG. 11 is a partially enlarged cross sectional view of a cylindrical body showing another embodiment of the present invention.

While the curled portions 5 and 7 of the first embodiment are fabricated, but not limited to, by inwardly curling the two edges 81 and 82 at both opening ends 4 and 6 of the roll 2, they may be shaped by any other manner. For example, as shown in FIG. 11, each edge 81 (82) of the roll 2 may be inwardly folded down to form a curled portion 51 (71). As the folded ends 5*a* and 7*a* of their respective curled portions are equally protected with protective tapes, their physical strength at the opening will be enhanced.

Figure 12:
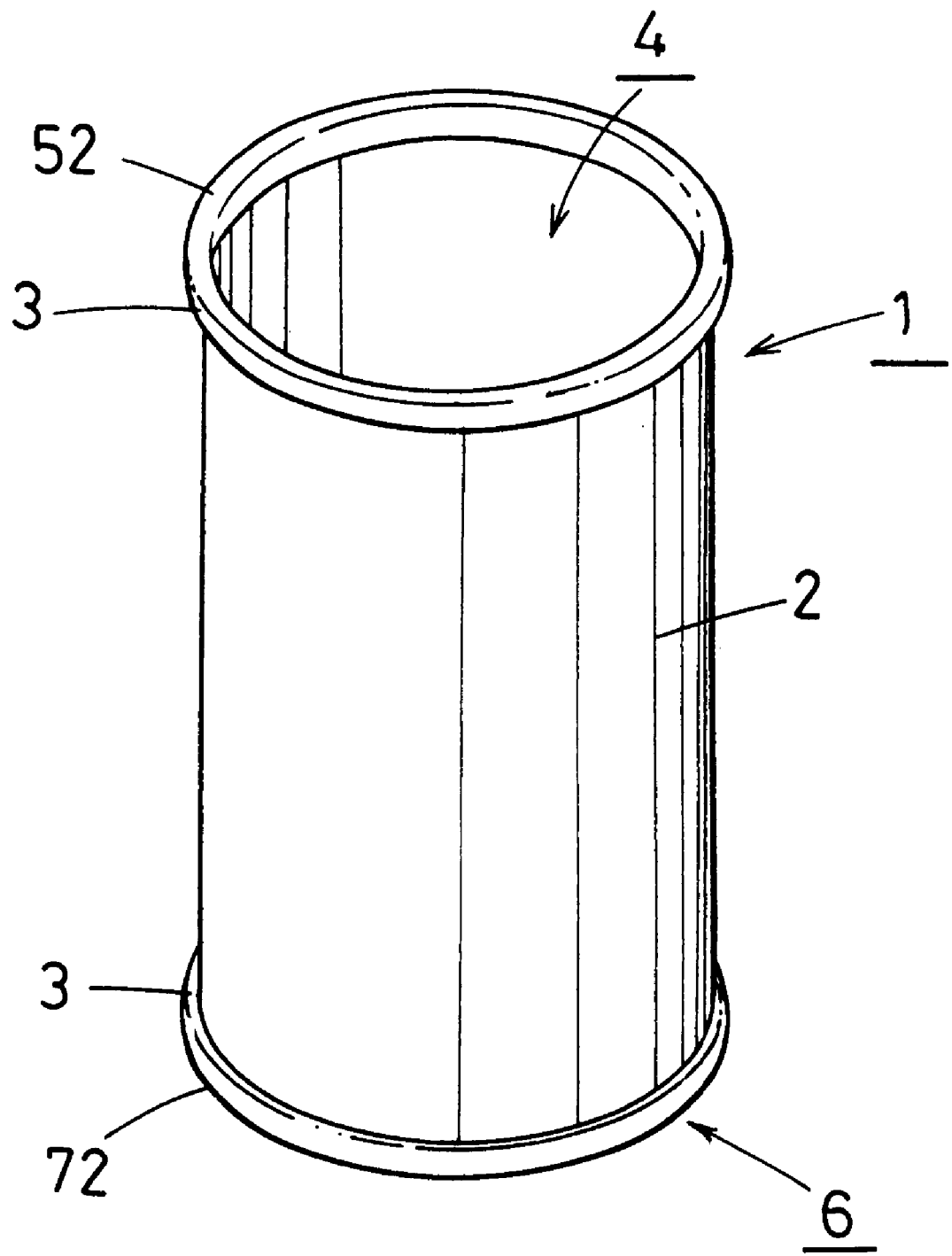
FIG. 12 is a perspective view of the cylindrical body of the another embodiment of the present invention.
Figure 13:
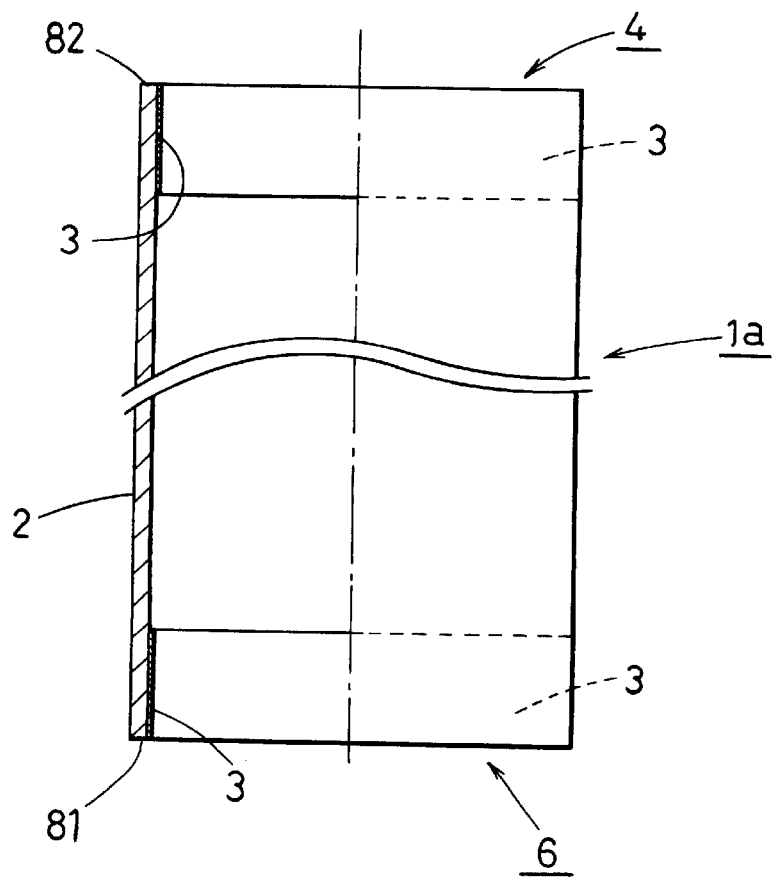
FIG. 13 is a cross section view of one side of the cylindrical body of the another embodiment where its body is protected with a protective tape.
Figure 14:
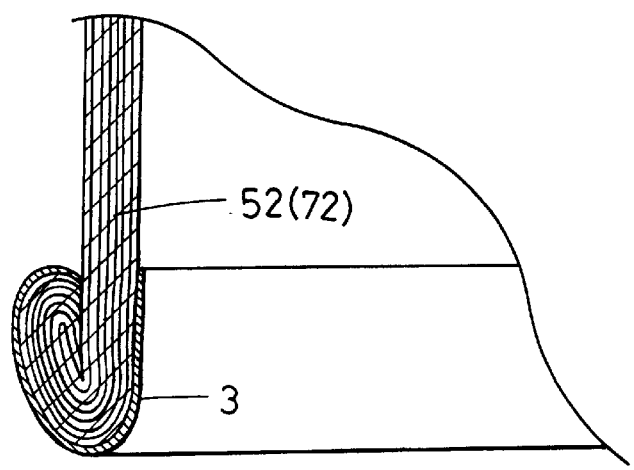
FIG. 14 is partially enlarged cross sectional view of the cylindrical body of the another embodiment of the present invention.
Figure 15:
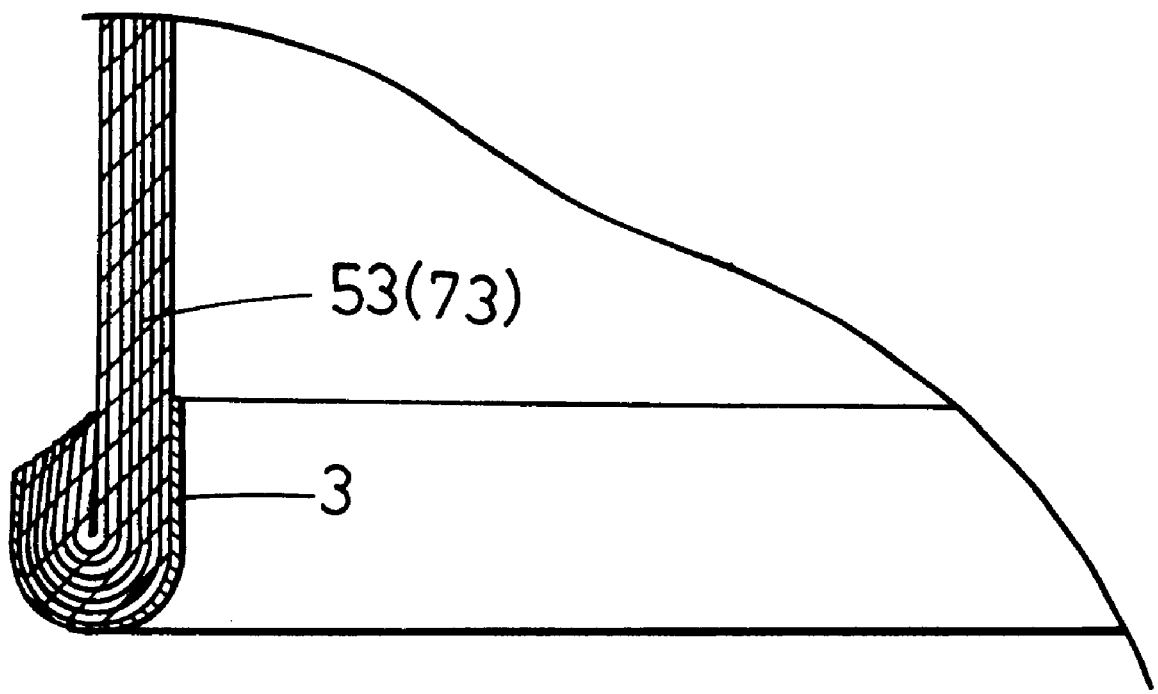
FIG. 15 is partially enlarged cross sectional view of the cylindrical body of the another embodiment of the present invention.

The protective tapes 3 may be applied circumferentially to the inner sides of the opening edges 81 and 82 at both ends of a green cylindrical body la to form a roll 2 as shown in FIG. 13. Then, each opening edge 81 (82) at one opening 4 or the other opening 6 of the roll 2 is outwardly curled to form a curled portion 52 (72), as shown in FIGS. 12 to 14. Alternatively, each opening edge 81 (82) of the roll 2 may be outwardly folded down to have a curled portion 53 (73) as shown in FIG. 15. In any case, the generation of paper dust can be inhibited while the physical strength of the edge at each opening is improved.

The above embodiments of the present invention are not limited to the opening edges 81 and 82 provided with their respective curled or folded portions 5 (51, 52, or 53) and 7 (71, 72, or 73), but may permit one of the two opening edges 81 and 82 to be accompanied with the curled or folded portion.

What is claimed is:

1. A cylindrical body of a fiber drum, comprising:
   a roll of paper having two open ends, plural wound layers with a cured adhesive between said plural wound layers, and a curled portion at at least one of said two open ends; and
   a protective material covering an outer surface of said curled portion,
   wherein said curled portion is formed by curling an edge of said at least one of said two open ends while the adhesive between said plural wound layers is in a non-cured state, and
   wherein said protective material is provided on said edge and is curled along with said edge.

2. The cylindrical body according to claim 1, wherein said protective material comprises a length of paper tape.

3. A method of fabricating a cylindrical body of a fiber drum, comprising
   winding a length of a paper sheet into layers such that a roll having two open ends is formed, with an adhesive existing between said layers;
   providing a protective material on an edge of at least one of said two open ends;
   curling said edge together with said protective material while the adhesive between said layers is in a non-cured state, thereby forming a curled portion at said at least one of said two open ends with said protective material covering an outer surface of said curled portion; and then
   curing the adhesive between said layers.

* * * * *